United States Patent [19]

Kendrick

[11] Patent Number: 4,945,675
[45] Date of Patent: Aug. 7, 1990

[54] DIVIDING, WATERING AND LIGHTING SYSTEM FOR LAWNS

[76] Inventor: Glen T. Kendrick, 1181 W. Talton Ave., Deland, Fla. 32720

[21] Appl. No.: 235,204

[22] Filed: Aug. 23, 1988

[51] Int. Cl.⁵ .............................................. A01G 1/00
[52] U.S. Cl. ........................................ 47/33; 239/201; 362/96; 362/152
[58] Field of Search ............... 362/92, 96, 152; 47/33, 47/25; 239/201, 268, 19

[56] References Cited

U.S. PATENT DOCUMENTS

| | | | |
|---|---|---|---|
| 2,883,114 | 4/1959 | Horvath | 362/96 |
| 2,909,328 | 10/1959 | Babyak | 239/268 |
| 2,920,184 | 1/1960 | Kessler | 47/33 X |
| 3,387,786 | 12/1969 | Rynberk | 47/33 X |
| 3,485,449 | 12/1969 | Wilson | 239/201 |
| 3,663,808 | 5/1972 | Baatz | 362/152 |

*Primary Examiner*—Mickey Yu
*Assistant Examiner*—Lynda M. Cofsky
*Attorney, Agent, or Firm*—Macdonald J. Wiggins

[57] ABSTRACT

A lawn and flower bed divider system uses sections formed from PVC or the like including straight and curved sections. The sections are hollow and contain integral water and electrical wiring conduits. The ends include fittings to interconnect the sections to form a continuous divider. Sprinkler heads are disposed along the divider and connected internally along the divider. Lighting fixtures are installed along the divider and internally connected to wiring in the wiring conduits. The water conduits are connected to a water source and the wiring is connected to a low voltage power source.

11 Claims, 2 Drawing Sheets

DIVIDING, WATERING AND LIGHTING SYSTEM FOR LAWNS

BACKGROUND OF THE INVENTION

1. Field of the Invention

The present invention relates to lawn dividers, and more particularly to a system for dividing grass areas from flower beds and the like which includes means for watering the beds and for lighting the landscape.

2. Description of the Prior Art

To maintain flower beds and other grass free areas, it is necessary to prevent grass in adjacent lawns from spreading into such areas. It is common to use cross ties, stones, bricks, metal edging and similar materials for this purpose. Such materials are not totally effective and often are not very attractive. Additionally, prior art dividers require additional devices for properly watering flowers and other plants. It is also desirable to illuminate attractive landscaping at night, requiring lighting fixtures and wiring to be installed.

Divider and sprinkler combinations are known in the art. For example, Rynberk, U.S. Pat. No. 3,387,786 discloses a tubular divider between lawns and beds having a buried flange. The tubular portion is connected to a water hose and includes openings therealong for sprinkling of beds. A hollow coping having a perforated wall is taught by Babyak, U.S. Pat. No. 2,909,328. The coping is connected to a water supply and acts as a divider and sprinkler.

For convenience, appearance and economy, it is desirable to provide a divider system which presents an attractive appearance and which includes both sprinklers and landscape lighting.

SUMMARY OF THE INVENTION

The present invention utilizes a lawn divider formed from a suitable plastic such as polyvinylchloride (PVC). The divider is fabricated in divider sections, including straight sections, curved sections, and angular sections. Each section is hollow and includes integral conduits for water and electrical wiring. Mating fittings are provided at the ends of sections such that the sections can be interconnected to form a continuous divider.

A top surface of each section may include conventional sprinkler heads internally connected to the water conduit. For example, a pop-up sprinkler head may be used which presents a clean appearance when not active. Electrical wiring, preferably of the low-voltage variety, is provided in the electrical conduit. A plurality of electrical connectors is provided, spaced along the conduit. Electrical lighting fixtures having flat domes, hemispherical domes, mushroom-type reflectors or other known designs, are spaced along top surfaces of sections and are plugged into adjacent electrical connectors within the sections. The sections preferably have a removable base plate to provide access to the water and wiring conduits.

In an alternative arrangement, piers are provided and are used to interconnect divider sections. A light fixture or sprinkler may be utilized on each pier.

It is therefore a principal object of the invention to provide an attractive lawn divider system having integral watering and lighting devices.

It is another object of the invention to provide a divider system having divider sections which include integral water conduits and electrical wiring conduits, and means for interconnecting the sections.

It is still another object of the invention to provide a divider system having sections including built-in sprinkler heads and lighting fixtures.

These and other objects and advantages of the invention will become apparent from the following detailed description when read in conjunction with the drawings.

DETAILED DESCRIPTION OF THE PREFERRED EMBODIMENT

Figure 1:
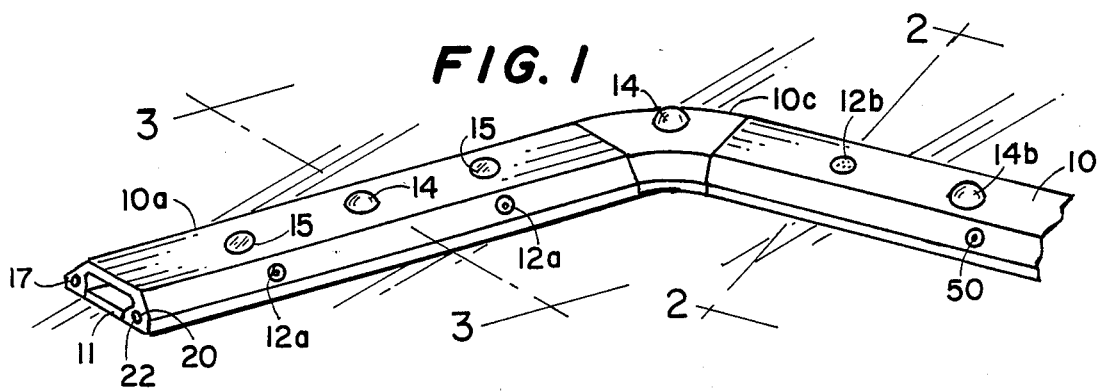
FIG. 1 is a perspective view of a portion of the divider system of the invention at a corner.

Referring to a perspective view of a portion of a lawn divider system of the invention shown in FIG. 1, a pair of straight divider sections 10a and 10b are shown at a corner, connected by a curved divider section 10c. Divider sections 10 are preferably extruded or molded from a rigid plastic such as PVC, although other materials may be used. A divider 10 may have a lateral cross sectional profile in the form of a trapezoid although the invention is not limited to such shape. Rectangular and curved profiles are equally suitable. The top surface of a divider 10 may include a light fixture 14 or a water sprinkler head 12b or both. Additionally, knockouts 15 may be provided for installation of additional light fixtures or sprinkler heads. The side faces may also mount sprinkler heads 12a. Although curved section 10c, as shown, includes a light fixture 14, sprinkler heads may also be included or substituted therefor. Connections 50 for soaker hoses and the like may also be provided along sections 10. In accordance with the invention, curved sections of any desired arc may be used.

Figure 2:
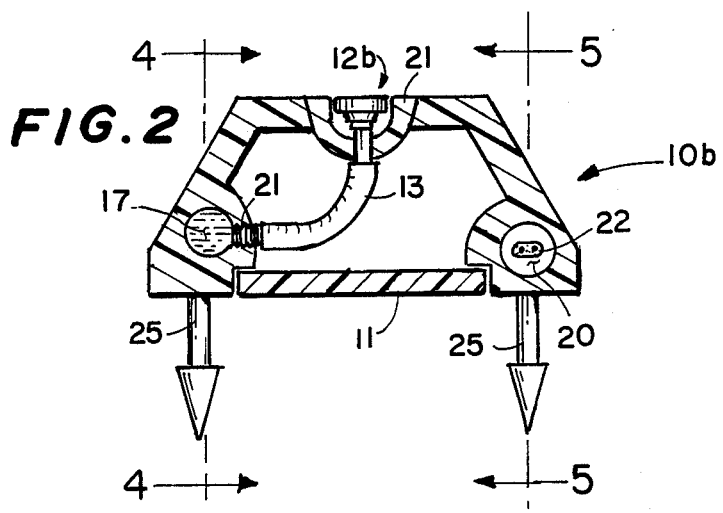
FIG. 2 is a lateral cross-sectional view of a divider section of FIG. 1 through the plane 2—2 showing a typical sprinkler.
Figure 3:
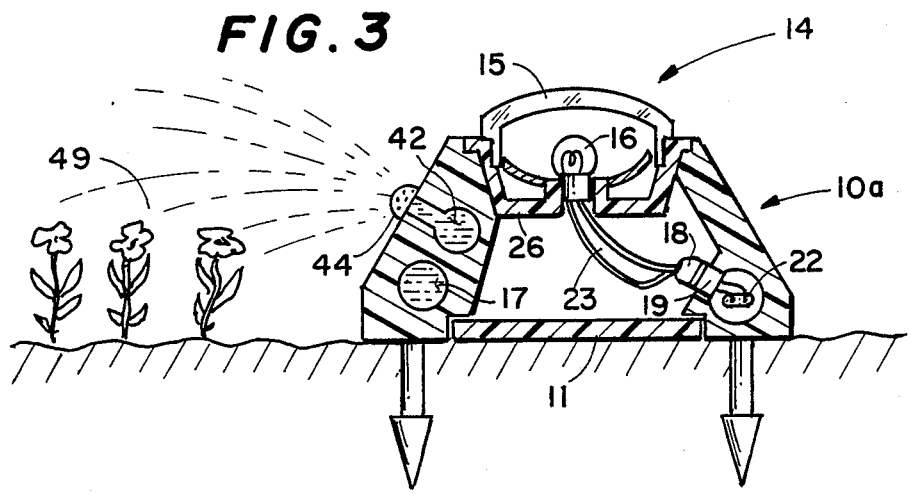
FIG. 3 is a lateral cross-sectional view of a divider section of FIG. 1 through the plane 3—3 showing a typical lighting fixture.

Additional details of the divider sections 10 are shown in FIGS. 2 and 3. FIG. 2 is a cross section of divider section 10b in the plane 2—2 of FIG. 1. A water conduit 17 is formed along the entire length of section 10b and includes a plurality of threaded outlets 21 along the length thereof. In FIG. 2, a pop-up sprinkler head 12b disposed along the top surface of section 10b is shown connected to outlet 21 by coupling 13 although other types of heads may be used in accordance with the invention.

Sprinkler head 12b is in insert 21. An installer may therefore remove a knockout 15 or cut an opening in the top surface of divider section at any other point for which a sprinkler head is required and cement an insert 21 therein. The head is then connected to the closest outlet 21. Unused outlets 21 are suitably plugged.

Access to the inner portion of divider section 10 is provided by bottom plate 11 which is formed to snap into section 10. However, plate 11 may be omitted if desired. A second conduit 20 is provided which carries wiring 22. As shown in FIG. 3, which is a cross section through plane 3—3 of FIG. 1, a light fixture 14 may be installed in the top surface of divider section 10a. A bulb 16 is mounted in base 26 and may include a suitable dome and reflector 15. Lamp wires 23 have a connector 18, mating with connector 19 which is tapped off from wiring 22. It is preferred that all lamps and wiring be of the low voltage type for safety reasons and economy. Thus, it is preferred that wiring 22 be connected to approved low voltage transformers. Light fixture 14 has been shown for exemplary purposes only and any desired design may also be used.

In FIG. 3, two water conduits 17 and 42 are shown. However, additional water conduits may be supplied in accordance with the invention. This permits a system of sprinklers to be independently controlled by an automatic sequencer. In the illustrated example, a sprinkler head 44 is disposed in a sidewall of section 10a facing a flower bed 49 to permit selective watering thereof. As indicated in FIGS. 2 and 3, a plurality of ground stakes 25 are attached to the bottom edges of divider sections 10. Stakes 25 preferably have enlarged arrow-type heads. When installing divider sections 10, stakes 25 are pushed into the earth to secure the dividers from accidental dislodgment.

Figure 4:
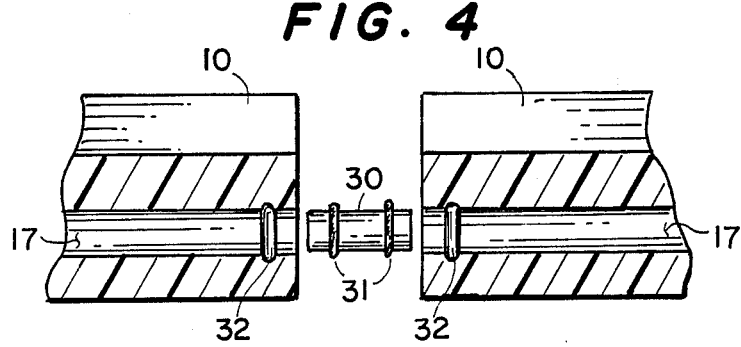
FIG. 4 is a longitudinal cross-section of a pair of divider sections through a water conduit thereof showing a water interconnection arrangement.
Figure 5:
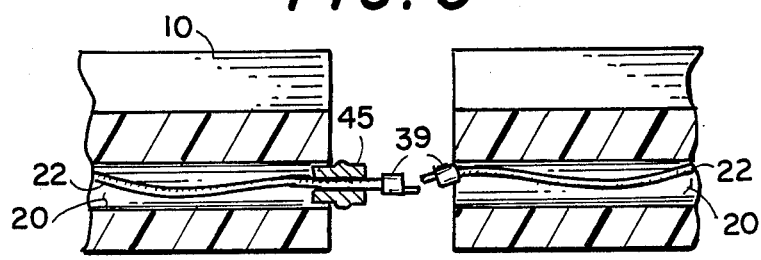
FIG. 5 is a longitudinal cross section of a pair of divider sections through a wiring conduit thereof showing an electrical interconnection arrangement.

Turning now to FIG. 4 and FIG. 5, details of a method of interconnection of divider sections 10 is shown. Water conduits 17 in FIG. 4 are shown in cross section 4—4 of FIG. 2 to have annular grooves 32 adjacent the ends thereof. A coupler 30 is provided having O-rings 31 molded or cemented as shown. When a pair of sections is joined, O-rings 31 snap into grooves 32. FIG. 5 shows a cross section 5—5 of FIG. 2 of wiring conduits 20 carrying wiring cables 22. A two wire connector 39 is provided for each cable 22. Connector 39 has one female and one male contact such that any pair of connectors may be joined. A rubber grommet 45 or the like is used to provide a waterproof joint between sections 10.

Figure 6:
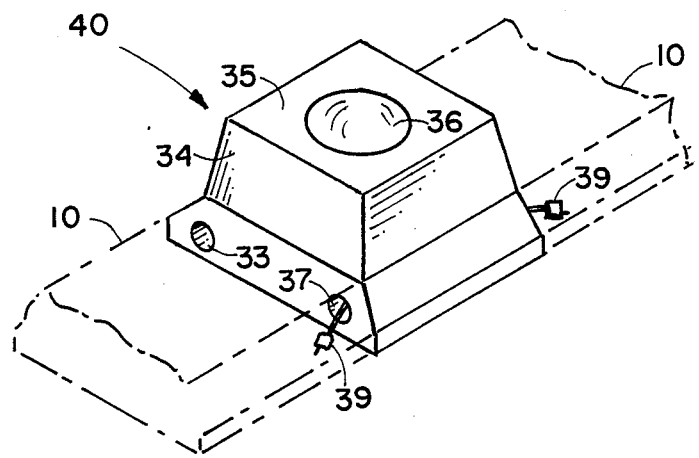
FIG. 6 is a perspective view of a pier which may be utilized to join divider sections.

An alternative arrangement which may be desirable for decorative purposes provides a plurality of piers for interconnecting divider sections 10. A perspective view of a typical pier 40 is shown in FIG. 6. As will be noted, pier 40 extends above the top surfaces of divider sections 10. A light fixture 36 is shown mounted on top surface 35 of pier 40. Body portion 34 includes a water conduit 33 and wiring conduit 37. Pier 40 may be molded from the same material as divider sections 10. Although an in-line pier 40 is shown in FIG. 6, the design may be modified for use at corners and at various angles. If desired, piers may also include sprinkler heads in accordance with the invention.

Figure 7:
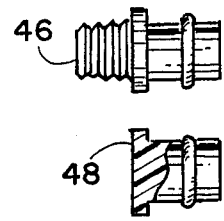
FIG. 7 shows a hose connector and end plug of the system.

Having described the elements of the lawn divider system of the invention, the installation and operation thereof will now be described. After interconnecting all divider sections, curves, corners and piers (if used), underground water lines are installed and connected to conduits 17 and 42. The water lines may be fed from an automatic sprinkler system. Alternatively, a hose connection 46, shown in FIG. 7, may be installed in the end water conduit 17 nearest a water faucet and a garden hose connected therebetween with sprinkling being controlled manually. The opposite end of a series of interconnected divider sections requires a terminating plug 48 to be installed in its water conduit 17 and 42.

The above arrangement permits sections to be disconnected and rearranged as desired. However, the system may be installed permanently with water conduits 17 and 42 interconnected by PVC nipples cemented in place.

Although specific embodiments have been disclosed, these are for exemplary purposes only and many variations and modifications may be made which are considered to fall within the scope and spirit of the invention.

I claim:

1. A system for dividing, watering and illuminating lawns, plant beds, and the like, having a source of electric power and a source of water, comprising:
   (a) a plurality of elongate divider sections, each of said sections having at least one water conduit formed therealong for connection to said source of water, said conduit having a plurality of threaded outlets;
   (b) at least one water sprinkler head disposed in said section and connected to one of said threaded outlets;
   (c) at least one wiring conduit formed along said section;
   (d) electrical wiring disposed in said wiring conduit and connected to said source of electrical power;
   (e) at least one electrical plug communicating with said wiring conduit and connected to said electrical wiring; and
   (f) at least one lighting fixture mounted on said section and connected to said electrical plug.

2. The system as recited in claim 1 in which said sections include interconnection means for connecting said sections together to form an extended divider.

3. The system as recited in claim 1 in which:
   each of said divider sections has an essentially trapezoidal cross section; and
   an inner volume of each of said divider sections is open such that said threaded outlets and said electrical plug are accessible from the bottom thereof.

4. The system as recited in claim 3 which includes a bottom plate for closing said open inner volume.

5. The system as recited in claim 1 in which each of said sections include a plurality of downwardly extending spikes for anchoring said sections in the earth.

6. The system as recited in claim 1 in which said sections are formed of plastic.

7. The system as recited in claim 1 in which said sections and said piers are formed from polyvinylchloride plastic.

8. The system as recited in claim 1 in which each of said sections and said piers include downward extending spikes for anchoring in the earth.

9. The system as recited in claim 1 in which each of said sections include knockouts to permit installation of additional sprinklers and light fixtures.

10. The system as recited in claim 1 in which at least some of said sprinkler heads are positioned to water a plant bed on one side of said divider system.

11. A dividing, watering and lighting system for separating flower beds from lawns, for illuminating said beds, and for watering said beds and said lawns, and for connection to a water supply and a source of electrical power comprising:
   (a) a plurality of elongate straight divider sections and a plurality of curved divider sections, each of said sections having a first end and a second end, at least one water conduit extending from said first end to said second end, and at least one electrical wiring conduit extending from said first end to said second end;
(b) a plurality of pier sections having water conduits and electrical wiring conduits therethrough for interconnecting said divider sections;
(c) electrical wiring disposed in each of said wiring conduits;
(d) a plurality of water sprinkler heads disposed along said sections, each of said heads connected internally of its section to said water conduit of its section;
(e) a plurality of light fixtures disposed along said sections, each of said fixtures connected internally of its section to said wiring of its section;
(f) interconnection means attached to said first and second ends for connecting a first end of one section to a second end of another section;
(g) said dividing sections and said pier sections connected together to form a divider of a desired length and configuration;
(h) one of said water conduits of said sections connected to said water supply; and
(i) said electrical wiring connected to said source of electrical power.

* * * * *